(12) United States Patent
Martin et al.

(10) Patent No.: US 10,096,835 B2
(45) Date of Patent: Oct. 9, 2018

(54) LITHIUM-ION ACCUMULATOR

(71) Applicant: COMMISSARIAT A L'ENERGIE ATOMIQUE ET AUX ENERGIES ALTERNATIVES, Paris (FR)

(72) Inventors: Jéan-Fréderic Martin, Renage (FR); Yohann Thomas, Grenoble (FR)

(73) Assignee: Commissariat a l'Energie Atomique et aux Energies Alternatives (FR)

( * ) Notice: Subject to any disclaimer, the term of this patent is extended or adjusted under 35 U.S.C. 154(b) by 142 days.

(21) Appl. No.: 15/383,467

(22) Filed: Dec. 19, 2016

(65) Prior Publication Data
US 2017/0200953 A1    Jul. 13, 2017

(30) Foreign Application Priority Data

Jan. 8, 2016 (FR) .................................... 16 50156

(51) Int. Cl.
*H01M 6/16* (2006.01)
*H01M 4/66* (2006.01)
(Continued)

(52) U.S. Cl.
CPC ............. *H01M 4/66* (2013.01); *H01M 4/485* (2013.01); *H01M 4/505* (2013.01); *H01M 4/525* (2013.01);
(Continued)

(58) Field of Classification Search
CPC ............... H01M 4/66; H01M 10/0568; H01M 10/0569; H01M 4/587; H01M 4/505;
(Continued)

(56) References Cited

U.S. PATENT DOCUMENTS

2013/0157129 A1* 6/2013 Uemura .................. C09D 5/24
429/211

FOREIGN PATENT DOCUMENTS

FR       2624526 A1    6/1989
FR       2944149 A1    10/2010

OTHER PUBLICATIONS

Search Report for French Application No. FR 1650156, dated May 31, 2016.
(Continued)

*Primary Examiner* — Gary D Harris
(74) *Attorney, Agent, or Firm* — Forge IP, PLLC

(57) ABSTRACT

A lithium-ion accumulator successively includes a first current collector; a negative electrode in contact with the first current collector; an electrode separator comprising an electrolyte, in contact with the negative electrode; a positive electrode in contact with the electrode separator; and a second current collector in contact with the positive electrode. The second current collector is made of aluminum covalently grafted with at least one phenyl aromatic group $C_6(R_i)_5$, in which formula:

$R_i$ designates $R_1$, $R_2$, $R_3$, $R_4$ and $R_5$ which are independently from one another selected from the group including:

$C(=O)O-Y^+$; $SO_3^-Y^+$; $CH_2-SO_3^-Y^+$; $NR_3^+X^-$; OH; $PO_3H^-Y^+$;

H; F; $C_nF_{2n+1}$; $C_nH_{2n+1}$;

$NO_2$; $-O-CH_2-O-$; imidazole groups; and derivatives of imidazole groups;

with Y=H, Na, K, Li, $NR'_4$; X=F, Cl, Br, I;

n being an integer in the range from 1 to 10;

R=$C_mH_{2m+1}$; R'=H, $C_mH_{2m+1}$ and mixtures thereof, m being an integer in the range from 1 to 10;

at least two groups $R_i$ being different from H.

10 Claims, 2 Drawing Sheets

(51) Int. Cl.
*H01M 10/0525* (2010.01)
*H01M 4/485* (2010.01)
*H01M 4/525* (2010.01)
*H01M 4/505* (2010.01)
*H01M 4/58* (2010.01)
*H01M 4/587* (2010.01)
*H01M 10/0569* (2010.01)
*H01M 10/0568* (2010.01)

(52) U.S. Cl.
CPC ......... *H01M 4/587* (2013.01); *H01M 4/5825* (2013.01); *H01M 10/0525* (2013.01); *H01M 10/0568* (2013.01); *H01M 10/0569* (2013.01); *H01M 2300/0025* (2013.01)

(58) Field of Classification Search
CPC .. H01M 4/525; H01M 4/485; H01M 10/0525; H01M 4/5825; H01M 2300/0025
USPC ....................................................... 429/331
See application file for complete search history.

(56) References Cited

OTHER PUBLICATIONS

X. Zhang, et al., "Passivation of Aluminum in Lithium-Ion Battery Electrolytes with LiBOB", Journal of the Electrochemical Society, 153 (9) B365-B369, 2006.
Assresahegan, et al., "Advances on the use of diazonium chemistry for functionalization of materials used in energy storage systems" ScienceDirect, Carbon 92 (2015) 362-381.

* cited by examiner

LITHIUM-ION ACCUMULATOR

TECHNOLOGICAL FIELD

The present description relates to a lithium-ion accumulator having a positive electrode associated with an aluminum current collector functionalized with aromatic groups.

The field of use of the present description generally relates to energy storage, and more particularly to the conversion of chemical energy into electrical energy.

BACKGROUND

Typically, an accumulator of lithium-ion type successively comprises a negative electrode, an electrolyte, and a positive electrode.

Its operation in discharge cycle is ensured by the transfer of lithium ions from the negative electrode (anode) to the positive electrode (cathode) and by the transfer of electrons from the negative electrode (anode) to the positive electrode (cathode) due to an external circuit. The transfers are reversible to enable the accumulator to charge.

The electrodes are generally associated with current collectors which ensure electron displacements therebetween.

The electrolyte generally comprises a lithium salt, for example, lithium bis(trifluoromethane)sulfonimide (LiTFSI) or lithium hexafluorophosphate ($LiPF_6$).

During the operation of the accumulator, the electrolyte salt may possibly partially decompose, and thus alter the properties of the accumulator. As an example, the $LiPF_6$ salt may generate HF-type compounds. The presence of LiTFSI salt in an electrolyte containing a solvent of ester carbonate type may cause the anodic dissolution of the aluminum which is used as a current collector for positive electrodes. This especially occurs when the electrode material comprises a lamellar oxide taken to a potential greater than 3.7 V vs. $Li^0$.

Prior art comprises various solutions enabling to overcome this issue, among which the use of a co-salt in the electrolyte, the increase of the salt concentration, the use of a current collector made of a material different from aluminum, but also the development of new salts or of new solvents.

However, such solutions generally turn out being expensive and unreliable as to their results.

A pretreatment of aluminum with the LiBOB (lithium bis(oxalate)borate) lithium salt has also been provided (Journal of Electrochemical Society, 2006 153 (9) B365-B369).

In any event, there still is a need to develop variations which are relatively easy to use, adapted to any type of salt and of electrolyte solvent.

SUMMARY OF THE DISCLOSURE

The presently described embodiments relate to a lithium-ion accumulator having a positive electrode associated with an aluminum current collector functionalized with aromatic groups. Such a functionalization of the current collector enables to attenuate or even to suppress the anodic dissolution phenomenon observed in prior art lithium-ion accumulators.

More specifically, the presently described embodiments relate to a lithium-ion accumulator successively comprising:
a first current collector;
a negative electrode in contact with the first current collector;
an electrode separator comprising an electrolyte, in contact with the negative electrode;
a positive electrode in contact with the electrode separator;
a second current collector in contact with the positive electrode.

According to the described embodiments, the second current collector is made of aluminum covalently grafted with at least one phenyl aromatic group $C_6(R_i)_5$, in which formula:

$R_i$ designates $R_1$, $R_2$, $R_3$, $R_4$ and $R_5$, which are independently from one another selected from the group comprising:
$C(=O)O-Y^+$; $SO_3^-Y^+$; $CH_2-SO_3^-Y^+$; $NR_3^+X^-$; OH; $PO_3H^-Y^+$;
H; F; $C_nF_{2n+1}$; $C_nH_{2n+1}$;
$NO_2$; $-O-CH_2-O-$; imidazole groups; and derivatives of imidazole groups;
with Y=H, Na, K, Li, $NR'_4$; X=F, Cl, Br, I;
n being an integer in the range from 1 to 10;
R=$C_mH_{2m+1}$; R'=H, $C_mH_{2m+1}$ and mixtures thereof, m being an integer in the range from 1 to 10;
at least two groups $R_i$ being different from H.

For more clarity, in formula $C_6(R_i)_5$, "$R_i$" designates the five groups $R_1$, $R_2$, $R_3$, $R_4$ and $R_5$, i being an integer in the range from 1 to 5.

Generally, the second current collector appears in the form of an aluminum foil having a thickness in the range from 2 to 100 micrometers, advantageously from 5 to 30 micrometers.

Thus, it advantageously has two main surfaces, one of which is in contact with the positive electrode.

According to a specific embodiment, the second aluminum current collector is grafted on a single main surface.

According to another embodiment, it is grafted on its two main surfaces with the same phenyl aromatic group $C_6(R_i)_5$ or with two phenyl aromatic groups $C_6(R_i)_5$.

In phenyl aromatic group $C_6(R_i)_5$, groups $R_1$, $R_2$, $R_3$, $R_4$ and $R_5$ are respectively at positions ortho, meta, para, meta and ortho with respect to the carbon atom covalently bonded to the second aluminum current collector, as indicated hereabove, asterisk * designating the carbon atom covalently linked to the second aluminum current collector:

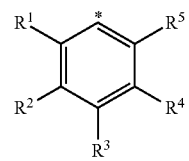

According to a preferred embodiment:
$R_1=R_3=R_5=H$ and
$R_2=R_4=CF_3$.

Further, phenyl aromatic group $C_6(R_i)_5$ advantageously amounts to from 0.1 to 10 wt. %, with respect to the weight of the second current collector, more advantageously from 0.1 to 5 wt. %.

The second current collector is in contact with the positive electrode of the accumulator.

The positive electrode may comprise an active electrode material selected from the group comprising transition metal oxides of $LiMO_2$ or $LiMO_4$ type; and the poly-anionic structures for example including transition metal phosphates $LiMPO_4$.

M being a metal or a mixture of transition metals for example including Ni, Mn, Co, Al, Fe, Ti, V.

Further, the positive electrode may generally comprise a binder (polyvinylidene fluoride, for example) and an electronically-conductive additive (carbon particles, for example).

The positive electrode may in particular comprise, by weight, the following proportions of binder/electronically-conductive additive/active material: 2/2/96 to 10/10/80.

As already indicated, the accumulator comprises an electrolyte positioned between the positive electrode and the negative electrode. The electrolyte may be supported, particularly by an electronically-insulating electrode separator.

The electrolyte comprises at least one lithium salt. For example, the salt may be selected from the group comprising lithium bis(trifluoromethane)sulfonimide (LiTFSI); lithium hexafluorophosphate ($LiPF_6$); lithium tetrafluoroborate ($LiBF_4$); lithium bis(fluorosulfonyl)imide (LiFSI); lithium perchlorate ($LiClO_4$); lithium hexafluoroarsenate ($LiAsF_6$); and lithium 4,5-dicyano-2-(trifluoromethyl)imidazole (LiTDI).

On the other hand, the electrolyte may also comprise at least one organic solvent, for example, a carbonate ester. This organic solvent may in particular be selected from the group comprising ethylene carbonate; propylene carbonate; diethyl carbonate; dimethyl carbonate, and mixtures thereof.

The electrolyte may be liquid at the operating temperature of the accumulator.

As already indicated, the electrolyte ensures the transfer of lithium ions between two electrodes of opposite signs.

In a discharge cycle, the positive electrode and the negative electrode of the accumulator respectively correspond to the cathode and to the anode.

The negative electrode may comprise an active electrode material selected from the group comprising graphite; hard carbon; $Li_4Ti_5O_{12}$ (LTO); and silicon.

Further, it may generally comprise a binder (polyvinylidene fluoride or carboxymethyl cellulose, for example) and an electronically-conductive additive (carbon particles, for example).

The negative electrode may in particular comprise, by weight, the following proportions of binder/electronically-conductive additive/active material: 2/2/96 to 10/10/80.

The negative electrode may also be made of metal lithium.

The electrodes are generally coated on the current collectors.

The grafting of the second aluminum current collector is generally achieved by reduction of a diazonium salt of formula $^+N_2$—$C_6(R_i)_5$. The grafting is generally performed chemically or electrochemically.

Electrochemical reduction (FIG. 2) is preferred given that it enables to predetermine and to optimize the grafting rate due to the control by cyclic voltammetry of the reaction and of its kinetics.

Prior to the grafting, diazonium salt $^+N_2$—$C_6(R_i)_5$ may be prepared by reaction between a nitrosating agent (sodium nitrite $NaNO_2$ or nitrous acid $HNO_2$) and an amine of formula $H_2N$—$C_6(R_i)_5$ according to conventional techniques (see, in particular, FIG. 1 and document Assresahegn et al., Carbon 92 (2015), pages 362-381).

The grafting of the second current collector enables to improve the lifetime of the accumulator according to the described embodiments by limiting or by stopping the anodic dissolution phenomenon.

The described embodiments and the resulting advantages will better appear from the following non-limiting drawings and examples, provided as an illustration of the claimed inventions.

DETAILED DESCRIPTION

The following examples implement a current collector made of aluminum (CE-1) or of aluminum grafted with an aromatic compound (CE-2, CE-3, INV-1).

The grafted aluminum current collectors have been prepared by reduction of a diazonium salt in the presence of an aluminum foil (commercial reference SUMIKEI A1085H-H18) in a standard assembly comprising three electrodes (−1.5 V vs. $Hg/Hg_2SO_4$) The tested diazonium salts are the following:

INV-1: $^+N_2$—$C_6(R_i)_5$ with i=1 to 5 and $R_1$=$R_3$=$R_5$=H; $R_2$=$R_4$=$CF_3$;

CE-2: $^+N_2$—$C_6(R_i)_5$ with i=1 to 5 and $R_1$=$R_2$=$R_5$=$R_4$=H; $R_3$=$CF_3$;

CE-3: $^+N_2$—$C_6(R_i)_5$ with i=1 to 5 and $R_1$=$R_2$=$R_5$=$R_4$=H; $R_3$=$SO_3H$.

The aluminum foils thus treated have then been placed at the metal lithium surface with a separator impregnated with electrolyte (1M LiTFSI in EC/PC 1/1 by volume; EC: ethylene carbonate; PC: propylene carbonate).

Figure 1:
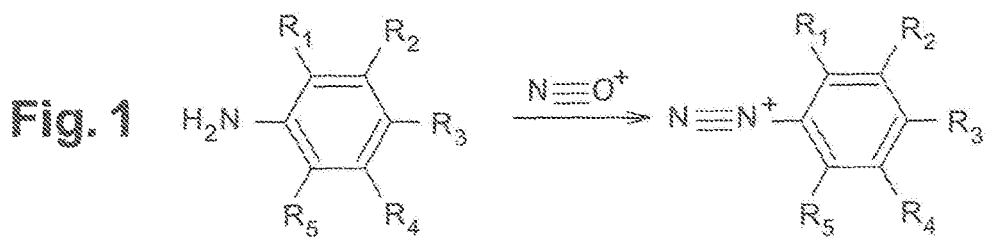
FIG. 1 illustrates the forming of a diazonium salt.
Figure 2:
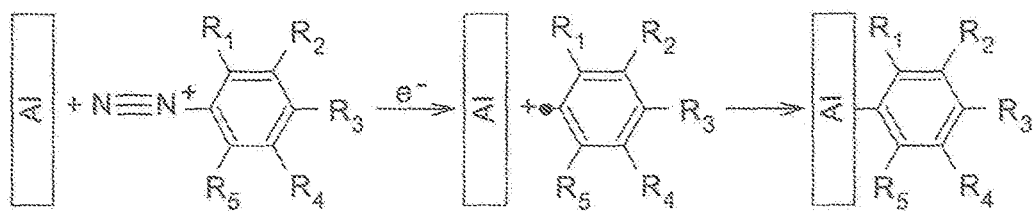
FIG. 2 illustrates the grafting of an aromatic compound on a substrate, by reduction of a diazonium salt.
Figure 3:
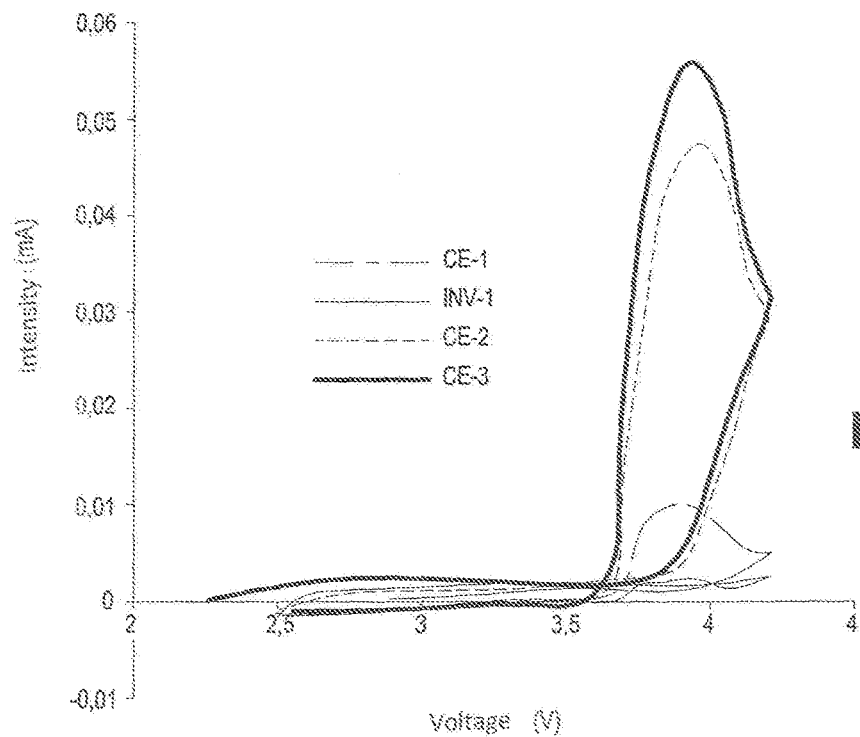
FIG. 3 illustrates the cyclic voltammograms for a current collector according to the invention or according to counter-examples.
Figure 4:
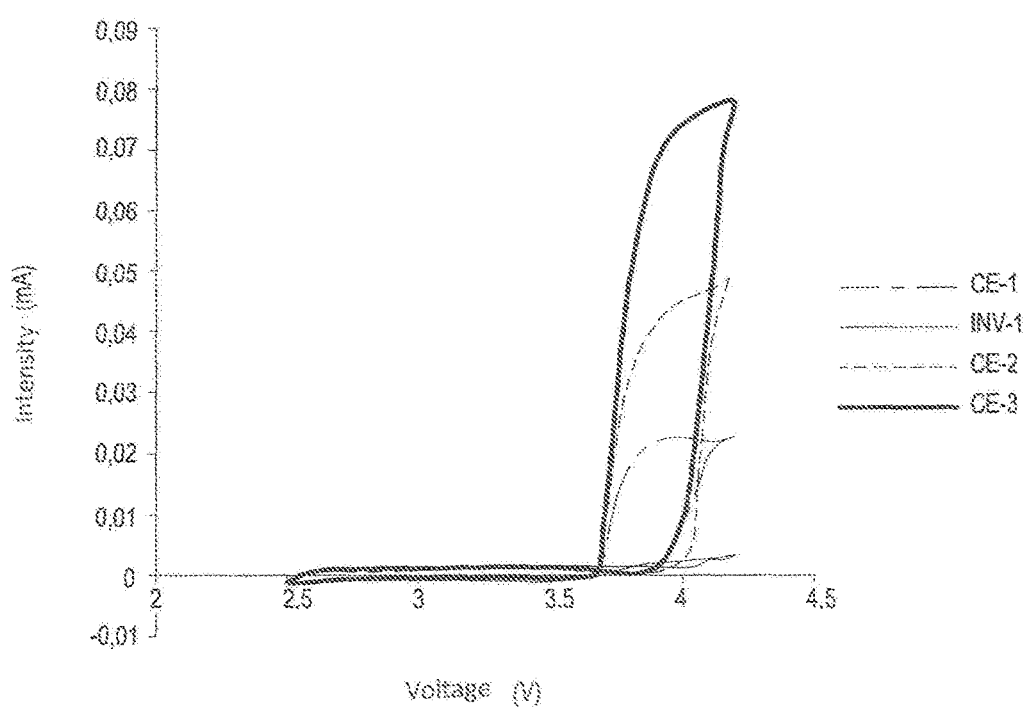
FIG. 4 illustrates the cyclic voltammograms for a current collector according to the invention or according to counter-examples.

These assemblies have been submitted to 10 voltammetric cycles at 1 mV/S between 2.5 and 4.2V vs. metal Li (FIGS. 3 and 4).

The aluminum foil (INV-1; two different substituents of H on $C_6(R_i)_5$) causes a strong decrease in the anode currents caused by the dissolution of aluminum.

As shown in FIG. 4 (10 cycles), this protection is stable over a plurality of cycles.

Foils CE-2 and CE-3 (a single substituent different from H on $C_6(R_i)_5$) conversely cause an increase of the anode currents, as compared with the conventional aluminum foil (CE-1). There may occur that the acid medium used degrades the natural passivation of aluminum and that afterwards, the treatment does not compensate for this weakening.

The invention claimed is:

1. A lithium-ion accumulator successively comprising:
a first current collector;
a negative electrode in contact with the first current collector;
an electrode separator comprising an electrolyte, in contact with the negative electrode;
a positive electrode in contact with the electrode separator;
a second current collector in contact with the positive electrode;

wherein the second current collector is made of aluminum covalently grafted with at least one phenyl aromatic group $C_6(R_i)_5$, in which formula:

$R_i$ designates $R_1$, $R_2$, $R_3$, $R_4$ and $R_5$ which are independently from one another selected from the group comprising:

$C(=O)O-Y^+$; $SO_3^-Y^+$; $CH_2-SO_3^-Y^+$; $NR_3^+X^-$; OH; $PO_3H^-Y^+;H$; F; $C_nF_{2n+1}$; $C_nH_{2n+1}$; $NO_2$; $-O-CH_2-O-$; imidazole groups; and derivatives of imidazole groups;

with Y=H, Na, K, Li, $NR'_4$; X=F, Cl, Br, I;

n being an integer in the range from 1 to 10;

$R=C_mH_{2m+1}$; R'=H, $C_mH_{2m+1}$ and mixtures thereof, m being an integer in the range from 1 to 10;

at least two groups $R_i$ being different from H.

2. The lithium accumulator of claim 1, wherein the second current collector appears in the form of an aluminum foil having a thickness in the range from 2 to 100 micrometers.

3. The lithium accumulator of claim 1, wherein $R_1=R_3=R_5=H$ and $R_2=R_4=CF_3$.

4. The lithium accumulator of claim 1, wherein phenyl aromatic group $C_6(R_i)_5$ amounts to from 0.1 to 10 wt. %, with respect to the weight of the second current collector.

5. The lithium accumulator of claim 1, wherein the electrolyte comprises at least one lithium salt selected from the group comprising lithium bis(trifluoromethane)sulfonimide; lithium hexafluorophosphate; lithium tetrafluoroborate; lithium bis(fluorosulfonyl)imide; lithium perchlorate; lithium hexafluoroarsenate; and lithium 4,5-dicyano-2-(trifluoromethyl)imidazole.

6. The lithium accumulator of claim 1, wherein the electrolyte comprises at least one organic solvent selected from the group comprising ethylene carbonate; propylene carbonate; diethyl carbonate; dimethyl carbonate, and mixtures thereof.

7. The lithium accumulator of claim 1:

wherein the positive electrode comprises an active material selected from the group comprising transition metal oxides $LiMO_2$ or $LiMO_4$; and transition metal phosphates $LiMPO_4$;

M being a metal or a mixture of transition metals including Ni, Mn, Co, Al, Fe, Ti, and V;

and wherein the negative electrode comprises an active material selected from the group comprising graphite; hard carbon; $Li_4Ti_5O_{12}$; and silicon.

8. The lithium accumulator of claim 1, wherein the positive electrode comprises, by weight, the following proportions of binder/electronically-conductive additive/active material: 2/2/96 to 10/10/80.

9. The lithium accumulator of claim 1, wherein the negative electrode comprises, by weight, the following proportions of binder/electronically-conductive additive/active material: 2/2/96 to 10/10/80.

10. The lithium accumulator of claim 1, wherein the second current collector is grafted by reduction of a diazonium salt of formula $^+N_2-C_6(R_i)_5$.

* * * * *